June 15, 1948.  D. LLOYD  2,443,467

ELECTRODE HOLDER

Filed Sept. 18, 1945

INVENTOR.
Donald Lloyd
BY
ATTORNEYS.

Patented June 15, 1948

2,443,467

UNITED STATES PATENT OFFICE 2,443,467

ELECTRODE HOLDER

Donald Lloyd, Oklahoma City, Okla., assignor of one-half to Albert C. Fletcher, Oklahoma City, Okla.

Application September 18, 1945, Serial No. 617,034

2 Claims. (Cl. 219—8)

This invention relates to improvements in electrode holders for use in electric arc welding and more particularly in improved control mechanism associated with the electrode holder for controlling the welding operation being performed by the holder.

In carrying out my invention I apply such control mechanism to a conventional type of electrode holder such as shown in the Reissue Patent 20,808 to Jack Churchward or any other electrode holder of similar construction. The control mechanism in accordance with this invention is particularly adaptable in the electric welding apparatus disclosed in a copending application of Albert C. Fletcher and Donald Lloyd, Serial No. 622,580, filed October 16, 1945, wherein a switch mechanism on the holder, for low voltage in accordance with this invention, is shown for controlling the welding current supplied through the welding electrode circuit.

With the above in view, the primary object of the present invention is to provide an improved electrode holder with a switch for the low voltage relay, or other similar operations extended to the electrode holder. This switch is characterized as being on the electrode holder guard at a distance from the handle and yet most convenient for operation by the thumb of the operator.

Another object of the invention is to locate the switch with respect to the electrode holder guard that it is in a protected position and not likely to be damaged or accidentally closed if the holder is dropped or roughly handled.

Further features, objects, details and advantages of my improved electrode holder switch mechanism will appear in the following description, in conjunction with the accompanying drawings, forming a part of this specification.

Referring to the drawings.

Figure 1:
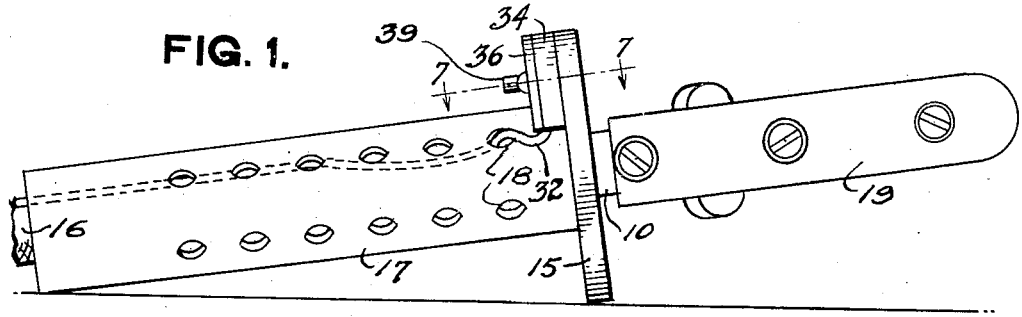
Figure 1 is a side elevation of an electrode holder embodying the improvements in accordance with my invention.

Referring to the drawings the electrode holder illustrated comprises in general spring gripping elements 10 and 11 for gripping a welding electrode 12 and an operating lever 13 for opening the jaws formed by the gripping elements for the reception or removal of the electrode carbon rod or the like. These gripping elements extend from a shank held in the end of an electrode cable connector 14 which also holds a guard 15 in position as shown, with the conductor cable 16 in place in the connector and extending through a handle 17 having ventilating apertures 18 therein mounted over the connector 14 and against the guard 15. Aside from external insulating covers 19 of Bakelite or the like on the gripping elements, the general construction of the electrode holder shown for purpose of illustration is described in detail in the aforementioned reissue patent to Jack Churchward.

Figure 3:
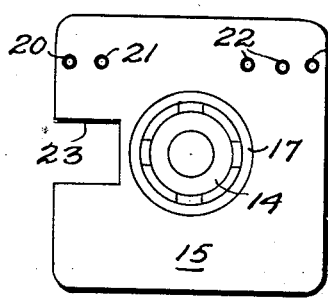
Figures 3, 4, 5 and 6 are face views of the holder guard illustrating details of the switch assembly respectively from the guard with threaded apertures therein for mounting the switch mechanism, the switch elements in place, the housing in place, to the complete switch with the housing cover secured in position.

In accordance with my invention, as shown in Figure 3, guard 15 is modified by providing threaded apertures 20, 21 and 22 therein in the right side above the recess 23 which has been provided to accommodate handle 13 in the operation of the electrode gripping element 10 and 11; otherwise the electrode holder is not structurally changed.

Figure 7:
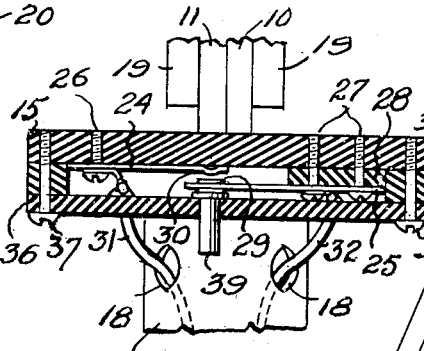
Figure 7 is an enlarged detail sectional view taken on line 7—7 of Figure 1 showing a side view of the switch.
Figure 4:
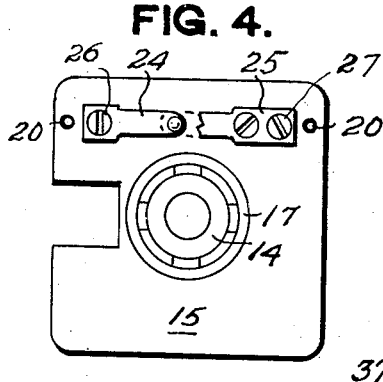
Figure 5:
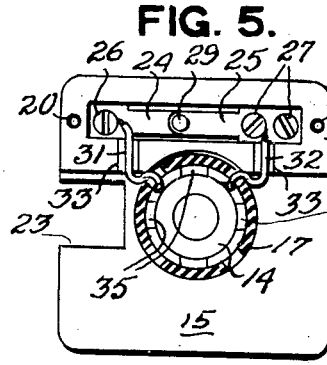

The simple switch blades 24 and 25, as shown in Figures 4, 5 and 7, are mounted on guard 15 by means of screws 26 and 27 threaded into apertures 21 and 22 respectively, and a block 28 positioned between switch blade 25 and guard 15 maintains the contact end 29 of this blade in a superposed position spaced beyond the contact 30 of switch blade 24.

In the further assembly of the switch, as shown in Figures 5 and 7, lead wires 31 and 32 are secured by screws 26 and 27 binding them in contact with the switch blades 24 and 25 respectively. These lead conductors extend through grooves 33 in a housing element 34 of fiber or Bakelite enclosing the sides of the switch blades and thence through ventilating apertures 18 adjacent to guard 15, along inside the handle between spacing lugs 35, or in grooves, or the like, in the end of the connector and along welding current cable 16 to the current control equipment.

Figure 6:
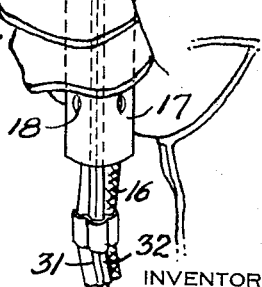

As shown in Figures 6 and 7, a cover 36 of Bakelite, fiber or the like is secured over housing element 34 by means of screws 37 extending into threaded apertures 20 in guard 15 so as to maintain a closed housing for the switch. Cover 36 is provided with a central aperture 38 in line with contacts 29 and 30 of the switch blades and an operating button 39 for these switch blade contacts extends outwardly through this aperture. Thus with cover 36 in place, the switch is entirely enclosed utilizing one face of guard 15, housing element 34 and cover 36 to provide a closed switch chamber, within the confines of the guard.

Figure 2:
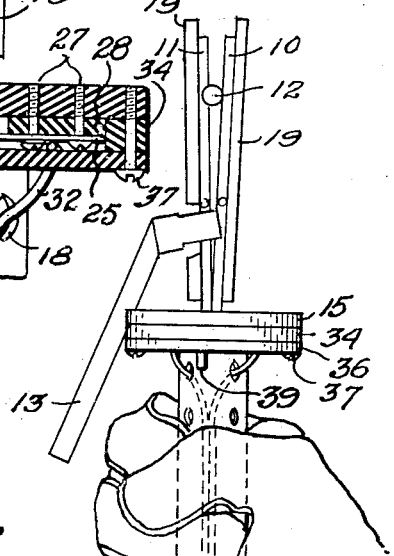
Figure 2 is an elevation view thereof illustrating the manner in which the electrode holder is gripped when in use with the switch mechanism adjacent to the operator's thumb.

Noting Fig. 2, it will be readily seen that switch operating button 39 is in the most convenient position for operation by the thumb of the operator for depressing the end of blade 25, so that its contact 29 will be brought into engagement with contact 30 of blade 24 for closing the control circuit. As shown in Figs. 1, 2 and 7, it will be noted the switch button 39 is substantially in the plane between the confronting faces of the electrode gripping elements 10 and 11 corresponding with the position for holding the electrode holder during operation.

Having described a highly satisfactory form of control switch mounted on the guard of an arc welding electrode holder it is not desired to limit my invention to the exact details of construction as herein set forth, so I therefore claim broadly:

1. A portable device for the handling of a conductor subject to carrying relatively high electric currents and the controlling thereof by the thumb of the operator including a tubular handle having its side walls provided with a plurality of ventilating apertures, in which handle said conductor is carried, a pair of conductors for a control circuit for controlling the current carried by said conductor also extending into said handle along with said first conductor and having terminals extending therefrom through apertures adjacent to the other end of the handle, a guard collar on said handle surrounding the end thereof beyond said control conductor terminals, and a switch mounted on the inner side of said guard collar between the handle and the periphery of the guard collar and connected with the extending terminals of said conductors for the control circuit.

2. A device of the character set forth in claim 1 wherein the switch element includes the rear surface of said guard providing part of a casing for the switch, as well as its mounting, a pair of blade elements supported one above the other on the guard, said switch having centrally located overlying contacts, and a push button engaging one of the switch contacts and adapted to be depressed to bring the contacts into engagement, a housing element abutting said guard and surrounding the sides of the switch, and a cover having a central opening through which said push button projects, on the other side of said housing element and secured to the guard.

DONALD LLOYD.

REFERENCES CITED

The following references are of record in the file of this patent:

UNITED STATES PATENTS

| Number | Name | Date |
| --- | --- | --- |
| 1,053,392 | Hills | Feb. 18, 1913 |
| 1,240,900 | Lymons | Sept. 25, 1917 |
| 1,240,901 | Lymons | Sept. 25, 1917 |
| 1,413,304 | Walsh | Apr. 18, 1922 |
| 1,497,012 | Goodspeed | June 10, 1924 |
| 1,589,977 | Lucas | June 22, 1926 |
| 1,729,059 | Bicsly | Sept. 24, 1929 |
| 1,883,807 | McIntire | Oct. 10, 1932 |
| 2,128,799 | Chapman | Aug. 30, 1938 |
| 2,378,707 | Hiller | June 19, 1945 |